US009166788B2

(12) United States Patent
Wong

(10) Patent No.: US 9,166,788 B2
(45) Date of Patent: Oct. 20, 2015

(54) METHOD AND DEVICE FOR OBTAINING A SECURITY KEY

(71) Applicant: GOLDEN VAST MACAO COMMERCIAL OFFSHORE LIMITED, Macao (CN)

(72) Inventor: Kwok Fong Wong, Macao (CN)

(73) Assignee: GOLDEN VAST MACAO COMMERCIAL OFFSHORE LIMITED, Macao (CN)

( * ) Notice: Subject to any disclaimer, the term of this patent is extended or adjusted under 35 U.S.C. 154(b) by 0 days.

(21) Appl. No.: 14/187,085

(22) Filed: Feb. 21, 2014

(65) Prior Publication Data

US 2015/0124969 A1    May 7, 2015

(30) Foreign Application Priority Data

Nov. 7, 2013   (CN) .......................... 2013 1 0549241

(51) Int. Cl.
*H04L 29/06* (2006.01)
*H04L 9/14* (2006.01)
*H04L 9/00* (2006.01)
*G06K 19/06* (2006.01)

(52) U.S. Cl.
CPC ............ *H04L 9/14* (2013.01); *G06K 19/06037* (2013.01); *H04L 9/006* (2013.01); *H04L 2209/24* (2013.01)

(58) Field of Classification Search
CPC ...................................................... H04L 9/006

USPC .......................................................... 713/156
See application file for complete search history.

(56) References Cited

U.S. PATENT DOCUMENTS

| 2007/0168674 | A1* | 7/2007 | Nonaka et al. ................ 713/182 |
| 2013/0124411 | A1* | 5/2013 | Kobres et al. .................. 705/43 |
| 2013/0167208 | A1* | 6/2013 | Shi .................................. 726/5 |

OTHER PUBLICATIONS

"JP-2008-282238"—Kubouchi et al. ("Name card information acquisition system"—2008).*

* cited by examiner

*Primary Examiner* — Longbit Chai
(74) *Attorney, Agent, or Firm* — CBM Patent Consulting, LLC

(57) ABSTRACT

A method comprises obtaining scan information by scanning a quick response QR code in a quick response key QRkey card, wherein the QR code includes a website link and a public key; opening a network platform page corresponding to the website link in the QR code; and obtaining a private key matching with the public key in the QR code and sending the private key to a user corresponding to the QRkey card, so that the user corresponding to the QRkey card can encrypt preset information by using the public key and decrypt the encrypted information by using the private key. A device comprises a first acquisition module, an open module and a second acquisition module. In the present invention a public key and a private key can be obtained by scanning a QR code in a QRkey card, thus a simple and convenient method for obtaining a key is provided.

8 Claims, 5 Drawing Sheets mation, and then decrypt these messages using a private key generated from the fingerprint information, thereby the safety of these messages can be ensured.

METHOD AND DEVICE FOR OBTAINING A SECURITY KEY

This application claims priority to CN Patent Application Ser. No. 201310549241.7 filed 7 Nov. 2013.

FIELD OF THE INVENTION

The invention relates to the field of communication technology, more particularly to a method and device for obtaining a key.

DESCRIPTION OF THE RELATED ART

With the rapid development of communication technology, the functionalities of computer networks become more and more powerful, and users of networks can chat with each other or send messages with each other, such as an email, video, audio, file and image. In order to protect these messages, currently users generally encrypt these messages utilizing a public key generated from fingerprint information, and then decrypt these messages using a private key generated from the fingerprint information, thereby the safety of these messages can be ensured.

However, in the prior art it is required that fingerprint information of a user is extracted by means of a fingerprint sensor, and thereby a public and private key can be obtained. From this, the existing method for obtaining a key is complicated.

SUMMARY OF THE INVENTION

In order to overcome the problems existing the prior art, the invention discloses a method and device for obtaining a key, and in the invention the following technical solutions are provided:

In one aspect, the invention provides a method for obtaining a key, comprising:

obtaining scan information by scanning a quick response QR code in a quick response key QRkey card, wherein the QR code includes a website link and a public key;

opening a network platform page corresponding to the website link in the QR code; and obtaining a private key matching with the public key in the QR code and sending the private key to a user corresponding to the QRkey card, such that the user corresponding to the QRkey card can encrypt preset information by using the public key and decrypt the encrypted information by using the private key.

In another aspect, the invention discloses a device for obtaining a key, comprising:

a first acquisition module for obtaining scan information by scanning a quick response QR code in a quick response key QRkey card, wherein the QR code includes a website link and a public key;

an open module for opening a network platform page corresponding to the website link in the QR code; and a second acquisition module for obtaining a private key matching with the public key in the QR code and sending the private key to a user corresponding to the QRkey card, so that the user corresponding to the QRkey card can encrypt preset information by using the public key and decrypt the encrypted information by using the private key. As compared with the prior art, the invention has the following advantages: a public key and a private key can be obtained by scanning a QR code in a QRkey card, thus in the invention the method for obtaining a key is simple and convenient.

BRIEF DESCRIPTION OF THE DRAWINGS

In order to illustrate more clearly the technical solutions of the embodiments of the invention, the drawings used in the embodiments will be described simply hereinafter. Obviously, the drawings are given by way of example, and for a person skilled in the art, other equivalent drawings can be obtained without departing from the spirit of the invention.

DESCRIPTION OF THE PREFERRED EMBODIMENTS

The present invention will be described hereinafter with reference to the accompanying drawings. It is to be noted, however, that the drawings are given only for illustrative purpose and therefore not to be considered as limiting of its scope, for the invention may admit to other equally effective embodiments.

In order to make the object, technical solutions and advantages of the invention more clearly, the embodiments will be described hereinafter more detailedly with reference to drawings.

Embodiment 1

Figure 1:
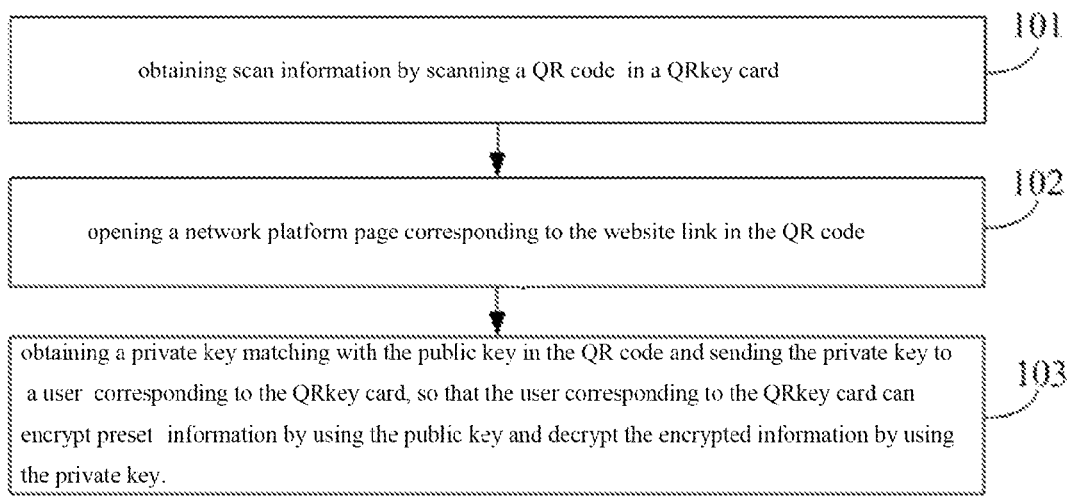
FIG. 1 is a flowing chart showing a method for obtaining a key according to a first embodiment of the invention.

The embodiment 1 of the invention provides a method for obtaining a key, as shown in FIG. 1, the method comprises:

101: obtaining scan information by scanning a QR(quick response) code in a QRkey(Quick Response key) card, wherein the QR code includes a website link and a public key;

102: opening a network platform page corresponding to the website link in the QR code;

103: obtaining a private key matching with the public key in the QR code and sending the private key to a user corresponding to the QRkey card, such that the user corresponding to the QRkey card can encrypt preset information by using the public key and decrypt the encrypted information by using the private key.

Preferably, between obtaining scan information by scanning the quick response QR code in the quick response key QRkey card and opening the network platform page corresponding to the website link in the QR code, the method also comprises:

parsing the QR code in the QRkey card to get the website link and the public key in the QR code.

Preferably, between opening a network platform page corresponding to the website link in the QR code and obtaining a private key matching with the public key in the QR code, the method further comprises:

displaying a registration prompting message in the network platform page to prompt the user corresponding to the QRkey card to register; and obtaining registration information of the user corresponding to the QRkey card, wherein the registration information comprises a user name and a password.

Preferably, obtaining a private key matching with the public key in the QR code and sending the private key to a user corresponding to the QRkey card comprises obtaining a run file for a preset function and sending it to the user corresponding to the QRkey card, so that the user corresponding to the QRkey card can run the preset function.

Preferably, the method also comprises destroying the public key in the QR code after obtaining a private key matching with the public key in the QR code.

By means of the method for obtaining a key in this embodiment of the invention, a public key and a private key can be obtained by scanning a QR code in a QRkey card, thus a simple and convenient method for obtaining a key is disclosed. A user can register only by enrolling a user name and a password, thus a convenient and quick registration method is achieved. In the invention, a run file for a preset function can be obtained and sent to a user, such that a user can use a preset function conveniently. Furthermore, in the invention the safety of information can be improved, because the public key in the QR code will be destroyed after the private key matching with the public key in the QR code is obtained, and thus the other users can not obtain the public key and private key.

Embodiment 2

Figure 2:
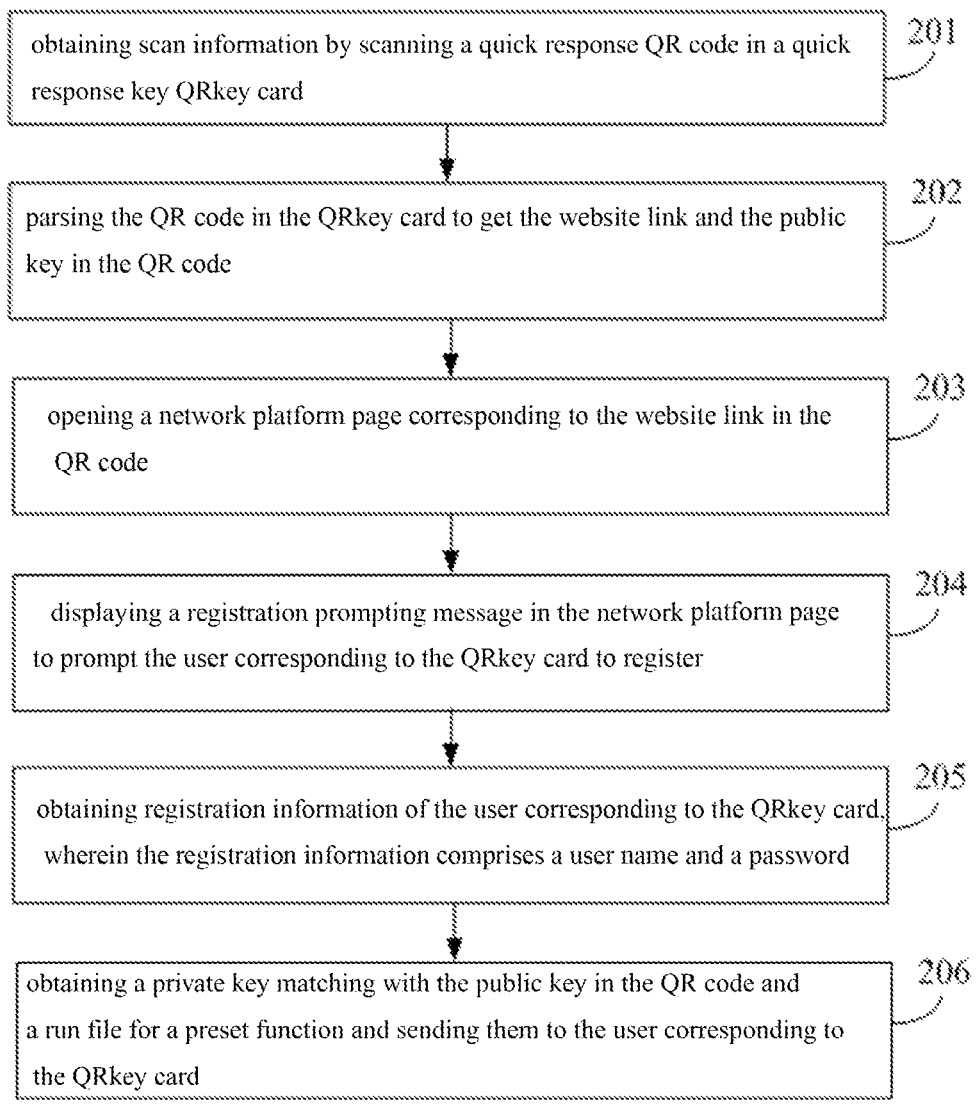
FIG. 2 is a flowing chart showing a method for obtaining a key according to a second embodiment of the invention.

The embodiment 2 of the invention provides a method for obtaining a key, as shown in FIG. 2, the method comprises:

201: obtaining scan information by scanning a quick response QR code in a quick response key QRkey card, wherein the QR code includes a website link and a public key;

202: parsing the QR code in the QRkey card to get the website link and the public key in the QR code;

203: opening a network platform page corresponding to the website link in the QR code;

204: displaying a registration prompting message in the network platform page to prompt the user corresponding to the QRkey card to register, specifically, the user corresponding to the QRkey card can enter into the corresponding registration page to register after noticing the registration prompting message;

205: obtaining registration information of the user corresponding to the QRkey card, wherein the registration information comprises a user name and a password;

specifically, registration can be achieved only by means of a user name and a password, and the user can register other information such as number of a mobile terminal according to practical applications;

206: obtaining a private key corresponding to the public key in the QR code and a run file for preset function and sending them to the user corresponding to the QRkey card, so that the user corresponding to the QRkey card can encrypt the preset information by utilizing the public key and decrypt the encrypted information by utilizing the private key, and run the preset function.

By means of the method for obtaining a key in this embodiment of the invention, a public key and a private key can be obtained by scanning a QR code in a QRkey card, thus a simple and convenient method for obtaining a key is disclosed. A user can register only by enrolling a user name and a password, thus a convenient and quick registration method is achieved. In the invention, a run file for a preset function can be obtained and sent to a user, such that a user can use a preset function conveniently. Furthermore, in the invention the safety of information can be improved, because the public key in the QR code will be destroyed after the private key matching with the public key in the QR code is obtained, and thus the other users can not obtain the public key and private key.

Embodiment 3

Figure 3:
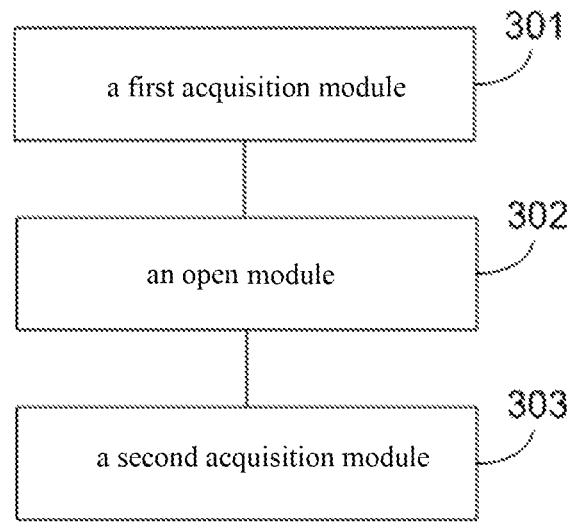
FIG. 3 is a schematic drawing showing a first device for obtaining a key according to a third embodiment of the invention.

The embodiment 3 of the invention discloses a device for obtaining a key, as shown in FIG. 3, the device comprises:

a first acquisition module 301 for obtaining scan information by scanning a quick response QR code in a quick response key QRkey card, wherein the QR code includes a website link and a public key;

an open module 302 for opening a network platform page corresponding to the website link in the QR code; and a second acquisition module 303, which is used for obtaining a private key matching with the public key in the QR code and sending the private key to a user corresponding to the QRkey card, so that the user corresponding to the QRkey card can encrypt preset information by using the public key and decrypt the encrypted information by using the private key.

Figure 4:
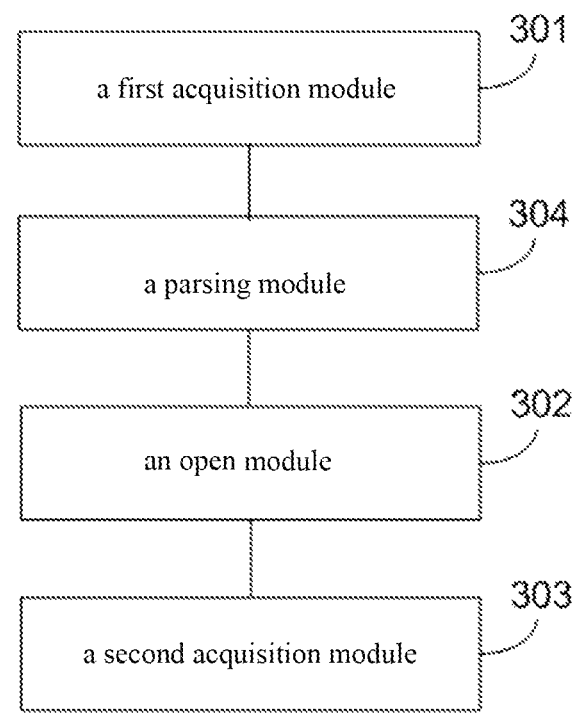
FIG. 4 is a schematic drawing showing a second device for obtaining a key according to a third embodiment of the invention.

Preferably, as shown in FIG. 4, the device also comprises:

a parsing module 304, which is used for parsing the QR code in the QRkey card to get the website link and the public key in the QR code, between obtaining scan information by scanning the quick response QR code in the quick response key QRkey card and opening the network platform page corresponding to the website link in the QR code.

Figure 5:
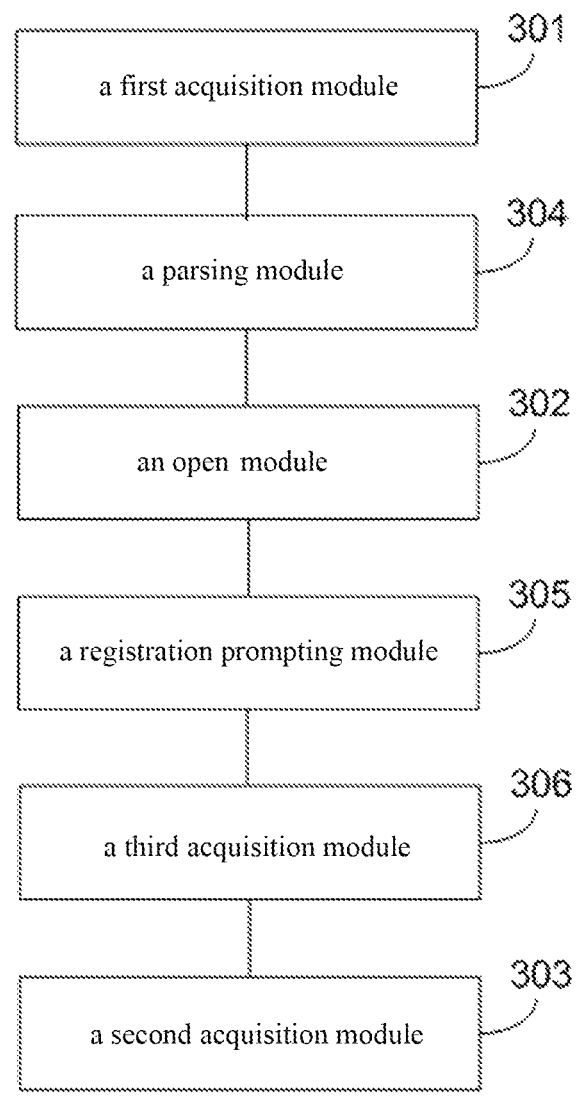
FIG. 5 is a schematic drawing showing a third device for obtaining a key according to a third embodiment of the invention.

Preferably, as shown in FIG. 5, the device further comprises:

a registration prompting module 305, which is used for displaying a registration prompting message in the network platform page to prompt the user corresponding to the QRkey card to register, between opening the network platform page corresponding to the website link in the QR code and obtaining the private key matching with the public key in the QR code; and a third acquisition module 306 for obtaining registration information of the user corresponding to the QRkey card, wherein the registration information comprises a user name and a password.

Preferably, the second acquisition module 303 also comprises:

an acquisition unit which is used for obtaining a run file for a preset function and sending it to the user corresponding to the QRkey card, so that the user corresponding to the QRkey card can run the preset function.

Figure 6:
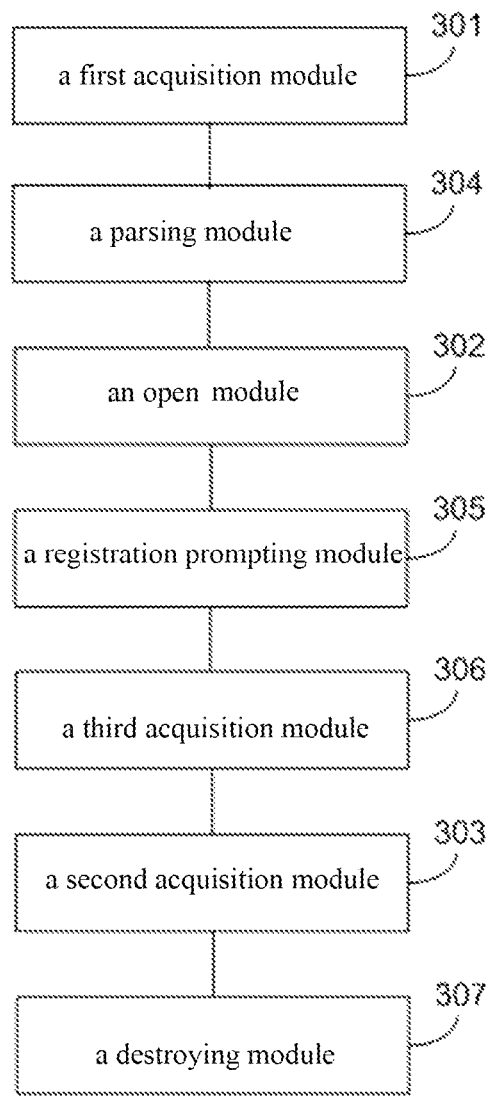
FIG. 6 is a schematic drawing showing a fourth device for obtaining a key according to a third embodiment of the invention.

Preferably, as shown in FIG. 6, the device also comprises:

a destroying module 307 for destroying the public key in the QR code after obtaining a private key matching with the public key in the QR code.

By means of the method for obtaining a key in this embodiment of the invention, a public key and a private key can be obtained by scanning a QR code in a QRkey card, thus a simple and convenient method for obtaining a key is disclosed. A user can register only by enrolling a user name and a password, thus a convenient and quick registration method is achieved. In the invention, a run file for a preset function can be obtained and sent to a user, such that a user can use a preset function conveniently. Furthermore, in the invention the safety of information can be improved, because the public key in the QR code will be destroyed after the private key matching with the public key in the QR code is obtained, and thus the other users can not obtain the public key and private key.

The numberings of the embodiments are given only for description, instead of representing the quality of the embodiments.

A person skilled in the art shall appreciate that, part or all of the steps achieving the above embodiments can be completed by means of hardware, or by instructing related hardware via a program, the program may be stored in a computer-readable storage medium which may be a read only memory (ROM), magnetic disk or optical disc or the like.

The preferred embodiments as above described are not intended for limiting of the invention, any variations, equivalent substitutions, improvement within the spirit and scope of the invention are contained in the extent of protection of the invention.

What is claimed is:

1. A method for obtaining a key, comprising:
   obtaining scan information by scanning a quick response QR code in a quick response key QRkey card with a scanner, wherein the QR code includes a website link and a public key;
   opening a network platform page corresponding to the website link in the QR code;
   obtaining a private key matching with the public key in the QR code and sending the private key to a user corresponding to the QRkey card and a run file for preset function, such that the user corresponding to the QRkey card can encrypt preset information by using the public key and decrypt the encrypted information by using the private key and run the preset function, wherein the private key is directly obtained by scanning a second QR code; and
   destroying the public key in the QR code after obtaining a private key matching with the public key in the QR code.

2. The method as claimed in claim 1, wherein the method also comprises:
   parsing the QR code in the QRkey card to get the website link and the public key in the QR code, between obtaining scan information by scanning the quick response QR code in the quick response key QRkey card and opening the network platform page corresponding to the website link in the QR code.

3. The method as claimed in claim 1, wherein between opening a network platform page corresponding to the website link in the QR code and obtaining a private key matching with the public key in the QR code the method further comprises:
   displaying a registration prompting message in the network platform page to prompt the user corresponding to the QRkey card to register; and
   obtaining registration information of the user corresponding to the QRkey card, wherein the registration information comprises a user name and a password.

4. The method as claimed in claim 1, wherein obtaining a private key matching with the public key in the QR code and sending the private key to a user corresponding to the QRkey card comprises obtaining a run file for a preset function and sending it to the user corresponding to the QRkey card, so that the user corresponding to the QRkey card can run the preset function.

5. A device for obtaining a key, comprising:
   at least one hardware processor(s):
   a first acquisition module for obtaining, using the hardware processor(s), scan information by scanning a quick response QR code in a quick response key QRkey card, wherein the QR code includes a website link and a public key;
   an open module for opening a network platform page corresponding to the website link in the QR code; and
   a second acquisition module, which is used for obtaining a private key matching with the public key in the QR code and sending the private key to a user corresponding to the QRkey card and a run file for preset function, so that the user corresponding to the QRkey card can encrypt preset information by using the public key and decrypt the encrypted information by using the private key and run the preset function, wherein the private key is directly obtained by scanning a second QR code; and
   a destroying module for destroying the public key in the QR code after obtaining the private key matching with the public key in the QR code.

6. The system as claimed in claim 5, wherein the device also comprises:
   a parsing module, which is used for parsing the QR code in the QRkey card to get the website link and the public key in the QR code, between obtaining scan information by scanning the quick response QR code in the quick response key QRkey card and opening the network platform page corresponding to the website link in the QR code.

7. The system as claimed in claim 5 wherein the device also comprises:
   a registration prompting module, which is used for displaying a registration prompting message in the network platform page to prompt the user corresponding to the QRkey card to register, between opening a network platform page corresponding to the website link in the QR code and obtaining a private key matching with the public key in the QR code; and
   a third acquisition module for obtaining registration information of the user corresponding to the QRkey card, wherein the registration information comprises a user name and a password.

8. The system as claimed in claim 5 wherein the second acquisition module also comprises:
   an acquisition unit, which is used for obtaining a run file for a preset function and sending it to the user corresponding to the QRkey card, so that the user corresponding to the QRkey card can run the preset function.

* * * * *